(12) United States Patent
Hsu

(10) Patent No.: US 9,476,440 B2
(45) Date of Patent: Oct. 25, 2016

(54) FIXING STRUCTURE FOR CASING AND METHOD FOR MANUFACTURING THE SAME

(71) Applicant: GETAC TECHNOLOGY CORPORATION, Hsinchu County (TW)

(72) Inventor: Po-Jen Hsu, Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 8 days.

(21) Appl. No.: 14/272,465

(22) Filed: May 7, 2014

(65) Prior Publication Data

US 2015/0198189 A1 Jul. 16, 2015

(30) Foreign Application Priority Data

Jan. 10, 2014 (CN) .......................... 2014 1 0012147

(51) Int. Cl.
| | | |
|---|---|---|
| *F16B 5/02* | (2006.01) | |
| *F16B 37/00* | (2006.01) | |
| *B29C 45/14* | (2006.01) | |
| *B29L 1/00* | (2006.01) | |
| *F16B 37/12* | (2006.01) | |
| *F16B 37/14* | (2006.01) | |
| *B29L 31/34* | (2006.01) | |

(52) U.S. Cl.
CPC ........... *F16B 5/02* (2013.01); *B29C 45/14065* (2013.01); *B29L 2001/00* (2013.01); *B29L 2031/3481* (2013.01); *F16B 37/122* (2013.01); *F16B 37/145* (2013.01)

(58) Field of Classification Search
CPC . F16B 37/122; F16B 37/00; F16B 2037/007
USPC ............................................ 411/386, 427, 38
See application file for complete search history.

(56) References Cited

U.S. PATENT DOCUMENTS

| | | | | |
|---|---|---|---|---|
| 4,214,792 | A | * | 7/1980 | Hardwicke et al. ......... 301/36.1 |
| 5,088,153 | A | * | 2/1992 | Winder et al. .................. 16/108 |
| 5,667,328 | A | * | 9/1997 | Hofle ............................. 403/282 |
| 6,193,456 | B1 | * | 2/2001 | Stumpf ................. F16B 37/122 411/180 |
| 8,757,575 | B2 | * | 6/2014 | Lin et al. .................. 248/346.03 |
| 2004/0034994 | A1 | * | 2/2004 | Chang ............................. 29/760 |
| 2009/0081390 | A1 | * | 3/2009 | Chen et al. .................. 428/34.1 |
| 2013/0002103 | A1 | * | 1/2013 | Peng .......................... 312/223.1 |

* cited by examiner

*Primary Examiner* — Fleming Saether

(57) ABSTRACT

A fixing structure for a casing and a method for manufacturing the same are provided. The fixing structure for a casing includes a hollow-core post, a fixing post, and a screwing element. The hollow-core post extends from the casing. The fixing post comprises a fixing segment. The fixing segment is inserted into the hollow-core post and has an inner screw hole. The screwing element is inserted into the casing and screwed to the inner screw hole. Therefore, the fixing structure is conducive to enhancement of the strength of engagement between the hollow-core post and the fixing post.

14 Claims, 14 Drawing Sheets

FIXING STRUCTURE FOR CASING AND METHOD FOR MANUFACTURING THE SAME

BACKGROUND OF THE INVENTION

1. Field of the Invention

The present invention relates to fixing structures, and more particularly, to a fixing structure for a casing and a method for manufacturing the same.

2. Description of the Prior Art

Taking into account of structural strength, the casings of rugged notebook computers are usually made of magnesium aluminum alloys. However, magnesium aluminum alloys are so expensive that they are readily replaced by cheap materials for use in the manufacturing of the casings of rugged notebook computers.

Low cost and high structural strength is among factors in choosing a high-density glass fiber material for use in the manufacturing of the casings of rugged notebook computers. To fix the motherboard of a notebook computer to the casing thereof from inside, it is necessary to fasten the motherboard and the casing together by means of a thermal copper pillar. Nonetheless, neither the high-density glass fiber material nor the thermal copper pillar has a high bonding strength. As a result, the thermal copper pillar cannot be efficiently fixed to the casing of the notebook computer. In view of this, there is still room for improvement on the prior art.

SUMMARY OF THE INVENTION

It is an objective of the present invention to provide a fixing structure for a casing, wherein the fixing structure has a fixing segment inserted into and fixed to a hollow-core post to enhance the structural strength of engagement between the hollow-core post and a fixing post.

In order to achieve the above and other objectives, the present invention provides a fixing structure for a casing, comprising a hollow-core post, a fixing post, and a screwing element; the hollow-core post protruding from the casing; the fixing post comprises a fixing segment, the fixing segment being inserted into the hollow-core post and having an inner screw hole; and the screwing element inserted into the casing and screwed to the inner screw hole.

In order to achieve the above and other objectives, the present invention provides a method for manufacturing a casing, comprising the steps of: a) providing a fixing post and forming an inner screw hole at the fixing post; b) providing a mold and disposing the fixing post in the mold; c) introducing a liquid high-density glass fiber material into the mold and forming integrally a casing and a hollow-core post in the mold, wherein the hollow-core post encloses the fixing post; and d) forming at the casing a through hole in communication with the inner screw hole.

In order to achieve the above and other objectives, the present invention further provides a method for manufacturing a fixing structure for use with a casing, comprising the steps of: a) providing a fixing post having an inner screw hole; b) providing a mold and disposing the casing and the fixing post in the mold, wherein the fixing post corresponds in position to the casing; c) introducing a liquid high-density glass fiber material into the mold and forming a hollow-core post in the mold, wherein the hollow-core post connects with the casing and encloses the fixing post; and d) forming at the casing a through hole in communication with the inner screw hole.

The present invention also has advantages as follows: first, a plurality of ribs of a hollow-core post reinforces the hollow-core post; second, fixing posts of different heights are manufactured as needed, and inner screw holes, through connection holes and inner threads of different depths are manufactured as needed; third, the through connection hole and the inner screw hole are in communication with each other as needed, so as to widen the application of the fixing structure; fourth, a casing and the hollow-core post are integrally formed in a cavity and formed from a high-density glass fiber material such that the hollow-core post encloses the fixing segment of the fixing post to increase the adhesion of the hollow-core post to the fixing segment and thus enhance the strength of engagement therebetween.

DETAILED DESCRIPTION OF THE EMBODIMENTS

The details and technical features of the present invention are described with reference to drawings. However, the drawings are illustrative rather than restrictive of the present invention.

Figure 1:
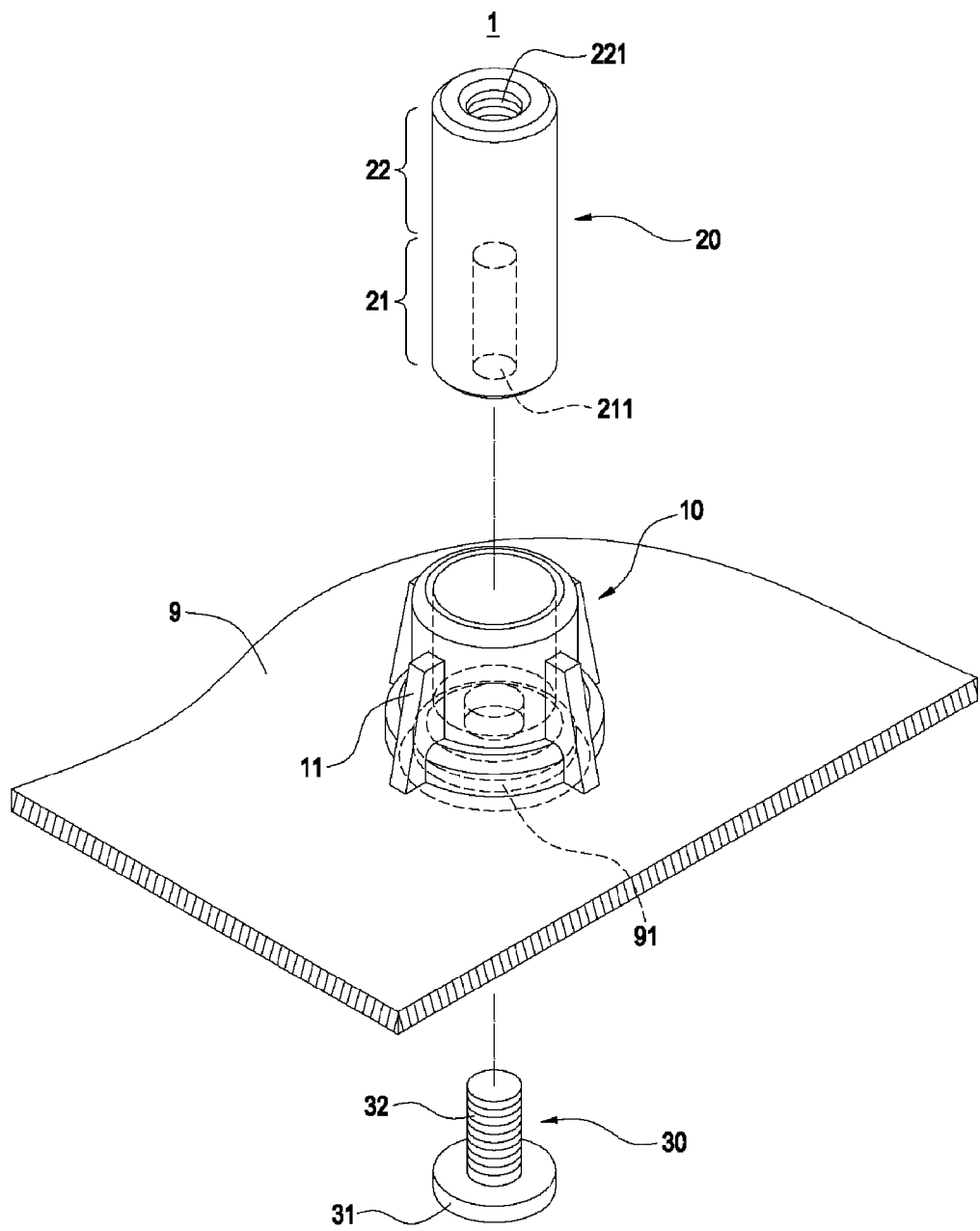
FIG. 1 is an exploded view of a fixing structure for a casing according to the present invention.

Referring to FIG. 1, there is shown an exploded view of a fixing structure 1 for a casing 9 according to the present invention. The present invention provides the fixing structure 1 for the casing 9. The fixing structure 1 essentially comprises a hollow-core post 10, a fixing post 20, and a screwing element 30.

Figure 2:
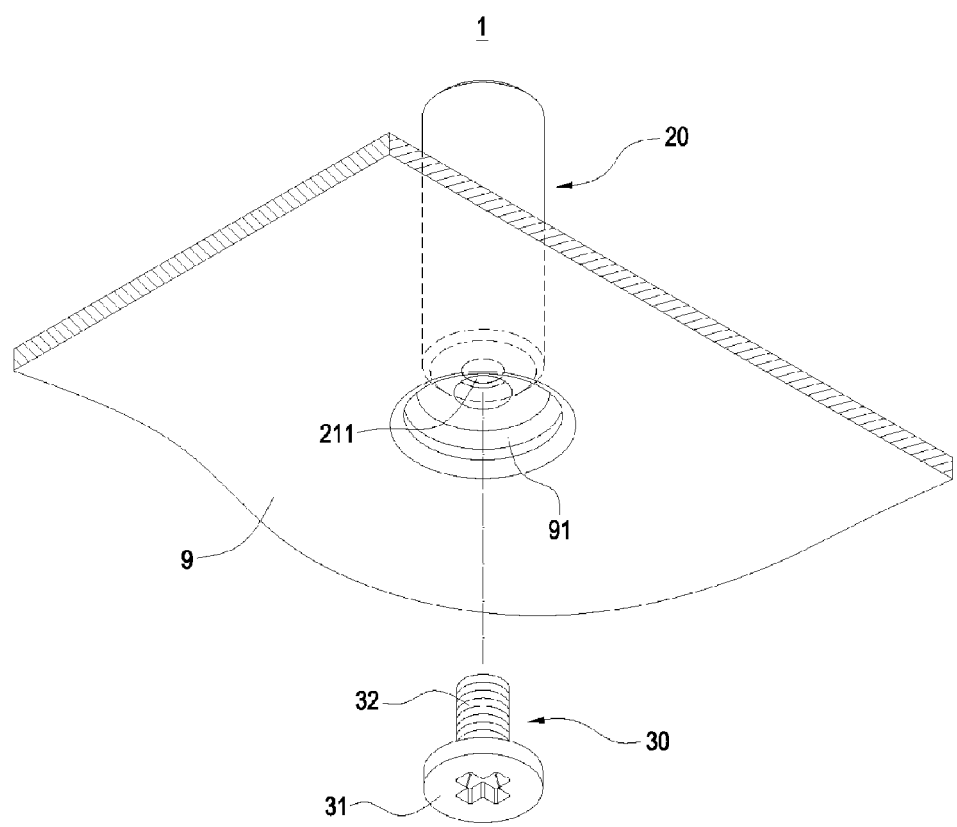
FIG. 2 is a schematic perspective view of the fixing structure for a casing according to the present invention.
Figure 3:
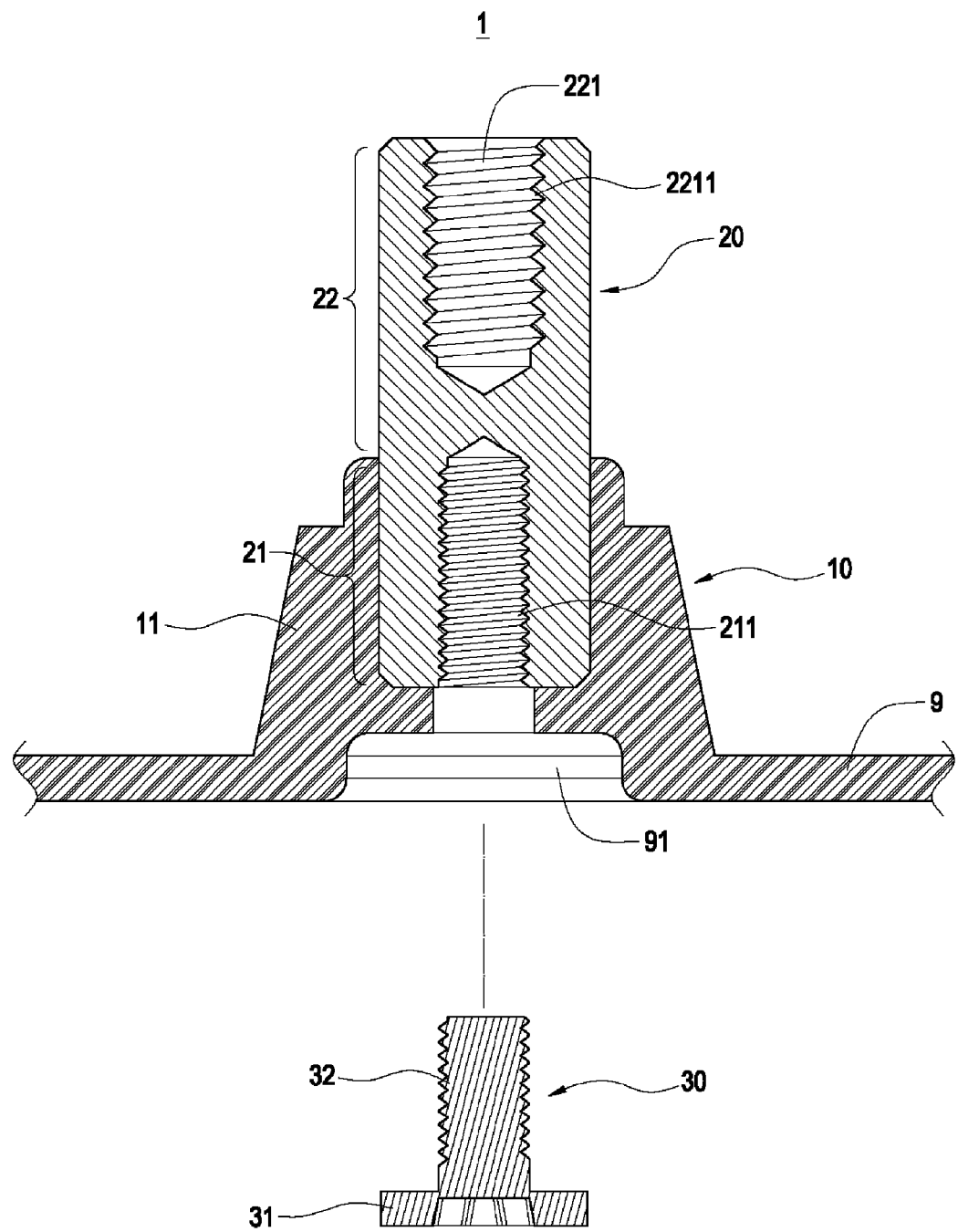
FIG. 3 is a cross-sectional view of the fixing structure for a casing according to the present invention.
Figure 4:
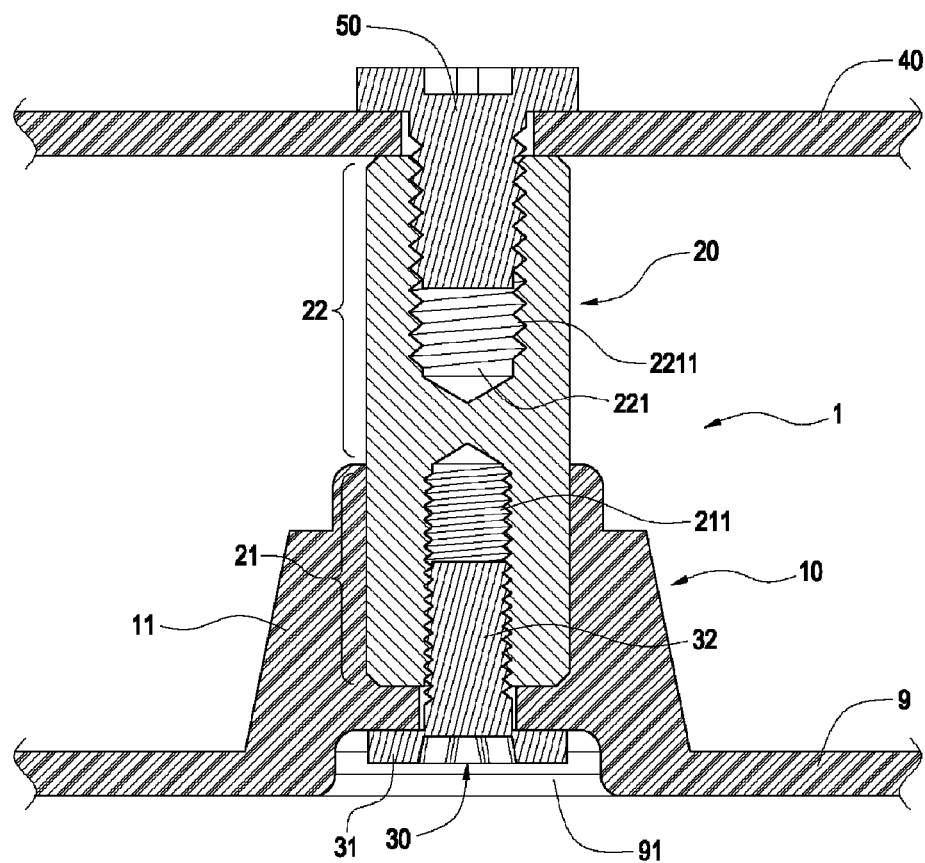
FIG. 4 is a schematic cross-sectional view of the fixing structure for a casing according to the present invention.

Referring to FIG. 2 through FIG. 4, there are shown a schematic perspective view, a cross-sectional view, and a schematic cross-sectional view of the fixing structure for a casing according to the present invention. As shown in the diagrams, the hollow-core post 10 protrudes from the casing 9, and a plurality of ribs 11 spaced apart from each other protrudes from the hollow-core post 10 radially. The hollow-core post 10 and the casing 9 are made of a high-density glass fiber material 100.

The fixing post 20 comprises a fixing segment 21 and a connecting segment 22. The fixing segment 21 of the fixing post 20 is inserted into and fixed to the hollow-core post 10. The fixing segment 21 of the fixing post 20 has an inner screw hole 211. As regards the fixing post 20, the connecting segment 22 extends from the fixing segment 21, such that the connecting segment 22 of the fixing post 20 is exposed from the hollow-core post 10. The connecting segment 22 of the fixing post 20 has a through connection hole 221. An inner thread 2211 is formed in the through connection hole 221 of the connecting segment 22 of the fixing post 20. Referring to FIG. 3 and FIG. 4, the inner screw hole 211 and the through connection hole 221 are separate. In another embodiment illustrated in FIG. 5B, the inner screw hole 211 of the fixing segment 21 and the through connection hole 221 of the connecting segment 22 are in communication with each other.

The screwing element 30 comprises an abutting portion 31 and a screwing segment 32. The screwing segment 32 extends from the abutting portion 31. The casing 9 has a through hole 91 in communication with the inner screw hole 211 of the fixing segment 21. The screwing segment 32 is inserted into the through hole 91 of the casing 9 and screwed to the inner screw hole 211 of the fixing segment 21, such that the abutting portion 31 abuts against the casing 9.

The fixing structure 1 further comprises an installation component 40. The installation component 40 is fastened to the through connection hole 221 by means of a fastening component 50, such that the installation component 40 is fixed to the casing 9.

Not only are the hollow-core post 10 and the casing 9 formed integrally by injection molding, but the hollow-core post 10 also wraps the fixing segment 21 of the fixing post 20 by wrapping by injection, so as to enhance the strength of engagement between the hollow-core post 10 and the fixing post 20, such that the installation component 40 is firmly fixed to the casing 9. Furthermore, the aforesaid design has a waterproof and dustproof effect.

The screwing element 30 is inserted into the through hole 91 of the casing 9 and thus screwed to the inner screw hole 211 of the fixing post 20 to therefore enhance the strength of engagement between the casing 9 and the fixing post 20. Hence, it is unlikely for the fixing post 20 to separate from the hollow-core post 10 under any external force.

The plurality of ribs 11 of the hollow-core post 10 reinforces the hollow-core post 10.

The fixing posts 20 of different heights are manufactured as needed. The inner screw holes 211, the through connection holes 221 and the inner threads 2211 of different depths are manufactured as needed. The through connection hole 221 and the inner screw hole 211 are in communication with each other as needed. Therefore, there is wide application of the fixing structure 1.

Figure 5A:
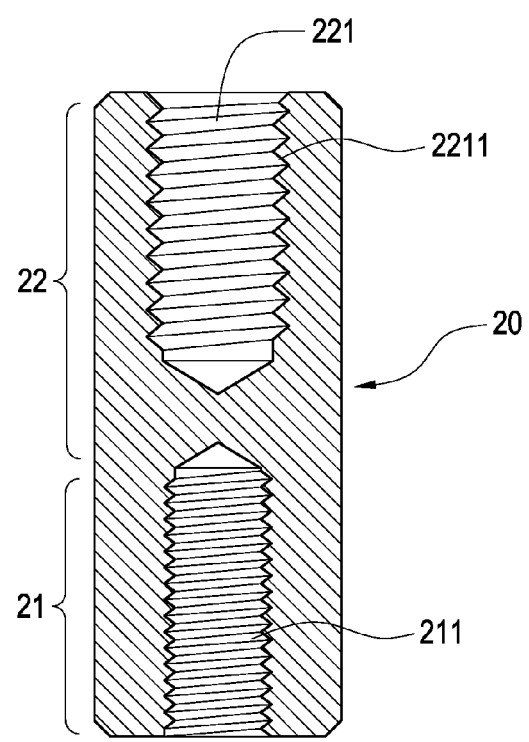
FIG. 5A is the first schematic view of a manufacturing method according to the first embodiment of the present invention.
Figure 5B:
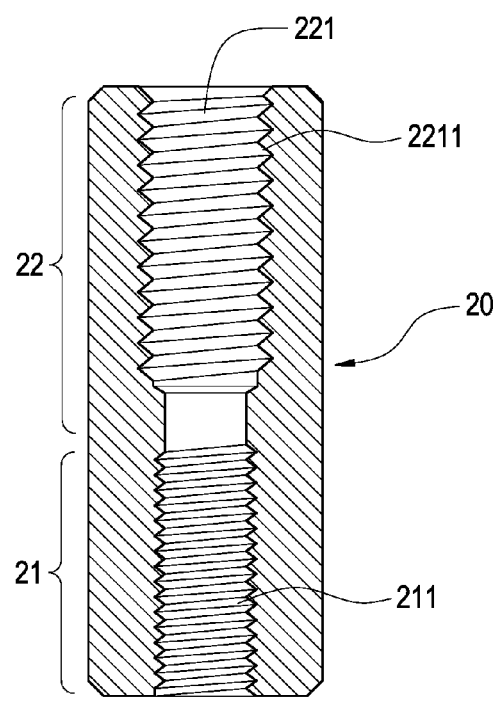
FIG. 5B illustrates a variation of the device shown in FIG. 5A.

Referring to FIG. 5A, there is shown the first schematic view of a manufacturing method according to the first embodiment of the present invention. As shown in the diagram, the method comprises the step of forming the inner screw hole 211 at the fixing segment 21 of the fixing post 20 and forming a through connection hole 221 at the connecting segment 22, wherein an inner thread 2211 is formed in the through connection hole 221 of the connecting segment 22.

Figure 6:
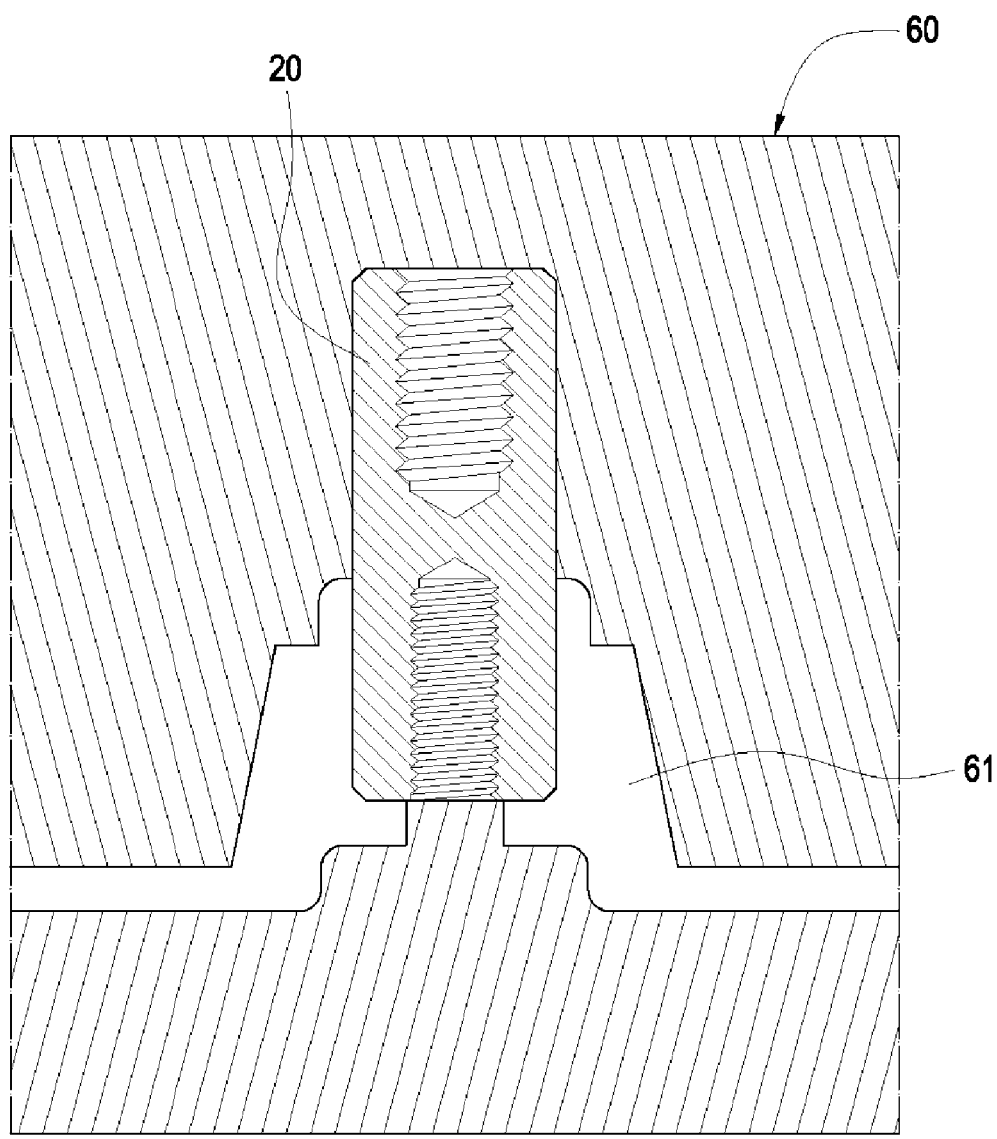
FIG. 6 is the second schematic view of the manufacturing method according to the first embodiment of the present invention.

Referring to FIG. 6, there is shown the second schematic view of the manufacturing method according to the first embodiment of the present invention. As shown in the diagram, the manufacturing method further comprises the step of disposing the fixing post 20 in a cavity 61 of a mold 60.

Figure 7:
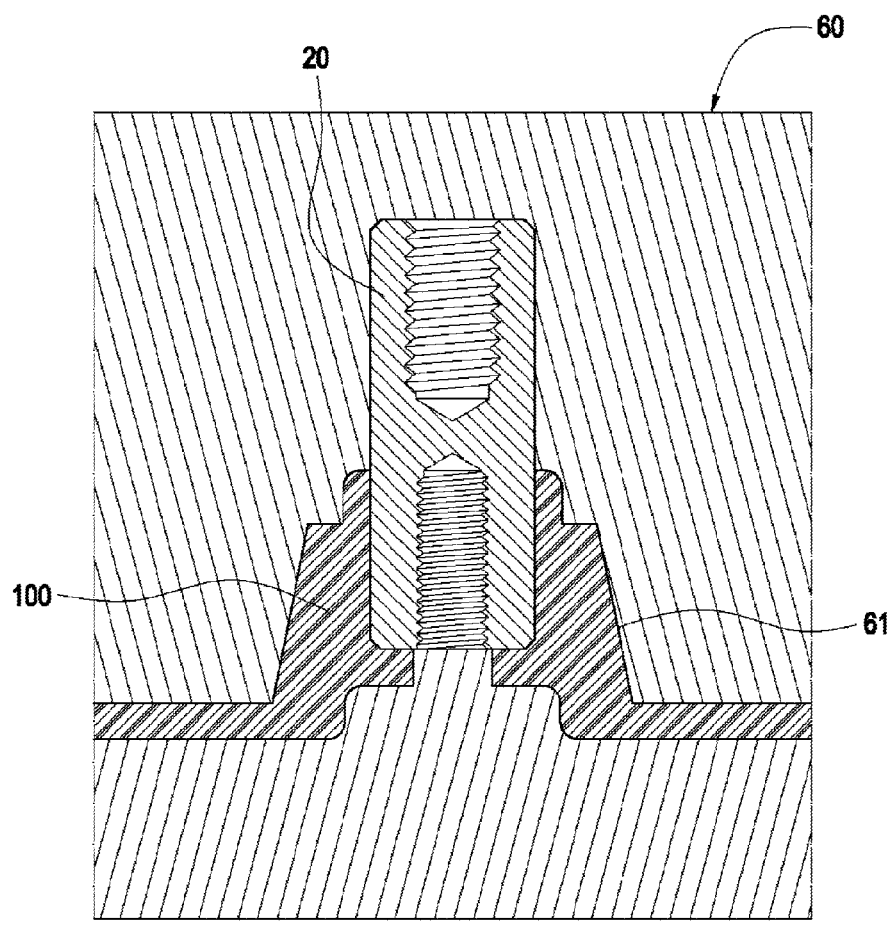
FIG. 7 is the third schematic view of the manufacturing method according to the first embodiment of the present invention.

Referring to FIG. 7, there is shown the third schematic view of the manufacturing method according to the first embodiment of the present invention. As shown in the diagram, the manufacturing method further comprises the step of introducing a liquid high-density glass fiber material 100 into the cavity 61. Hence, in the cavity 61, the casing 9 and the hollow-core post 10 are integrally formed from the high-density glass fiber material 100. The hollow-core post 10 encloses the fixing segment 21 of the fixing post 20.

Figure 8:
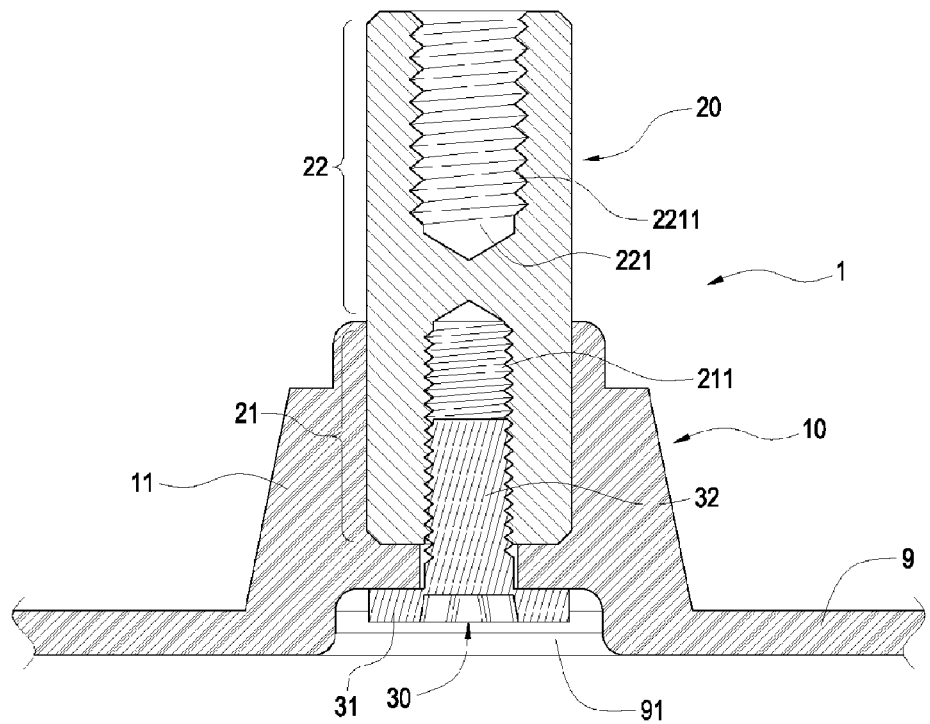
FIG. 8 is the fourth schematic view of the manufacturing method according to the first embodiment of the present invention.
Figure 9:
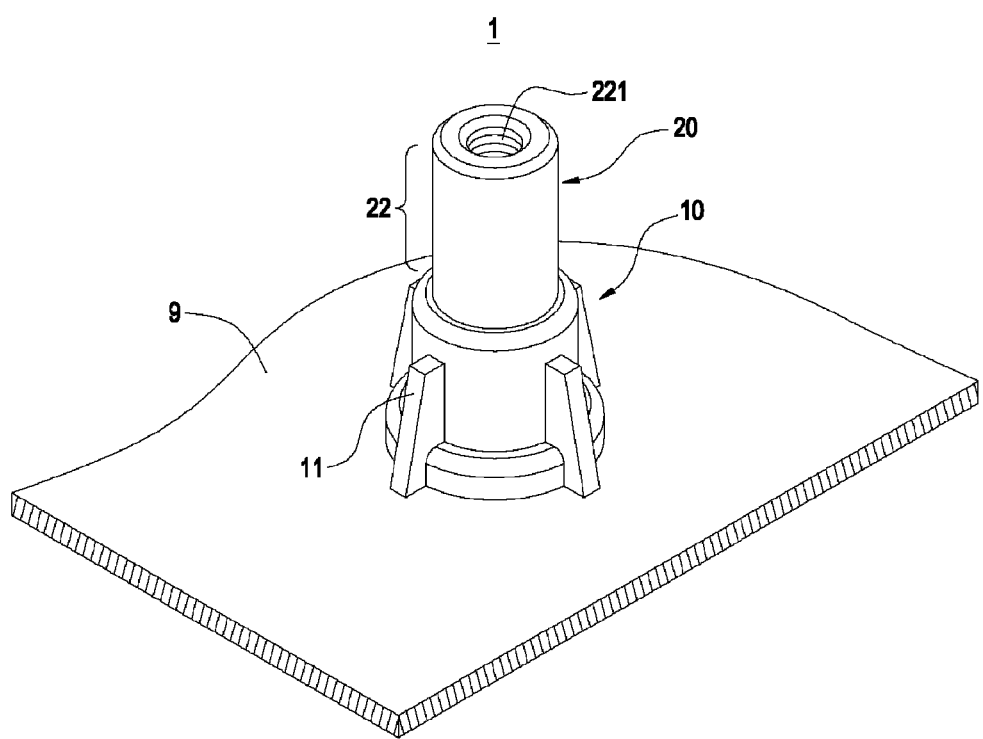
FIG. 9 is a schematic view of completion of the manufacturing method according to the first embodiment of the present invention.

Referring to FIGS. 8, 9, there are shown the fourth schematic view of the manufacturing method and a schematic view of completion of the manufacturing method according to the first embodiment of the present invention, respectively. As shown in the diagrams, the manufacturing method further comprises the step of forming at the casing 9 a through hole 91 in communication with the inner screw hole 211, wherein the screwing element 30 is inserted into the through hole 91 and screwed to the inner screw hole 211 of the fixing segment 21 to allow the abutting portion 31 to abut against the casing 9 and allow the screwing segment 32 to be inserted into the through hole 91 of the casing 9 and screwed into the inner screw hole 211 of the fixing segment 21.

Finally, the installation component 40 is fastened to the through connection hole 221 of the connecting segment 22 by means of a fastening component 50 and thereby screwed to the inner thread 2211 of the connecting segment 22, such that the installation component 40 is fixed to the casing 9, as shown in FIG. 4.

In the cavity 61, the casing 9 and the hollow-core post 10 are integrally formed from the high-density glass fiber material 100, such that the hollow-core post 10 encloses the fixing segment 21 of the fixing post 20 to therefore increase the adhesion of the hollow-core post 10 to the fixing segment 21 of the fixing post 20 and thus enhance the strength of engagement therebetween.

Figure 10:
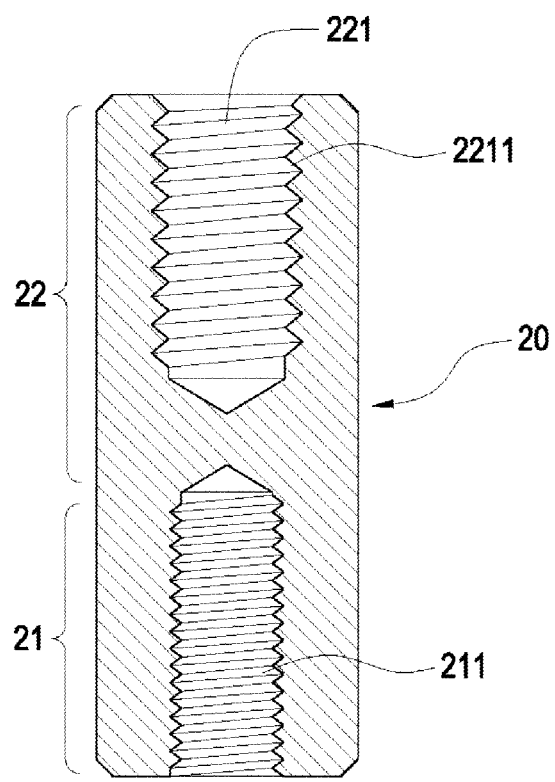
FIG. 10 is the first schematic view of another manufacturing method according to the second embodiment of the present invention.

Referring to FIG. 10, there is shown the first schematic view of another manufacturing method according to the second embodiment of the present invention. As shown in the diagram, the manufacturing method comprises the step of forming an inner screw hole 211 at the fixing segment 21 of the fixing post 20 and forming a through connection hole 221 at the connecting segment 22. An inner thread 2211 is formed in the through connection hole 221 of the connecting segment 22.

Figure 11:
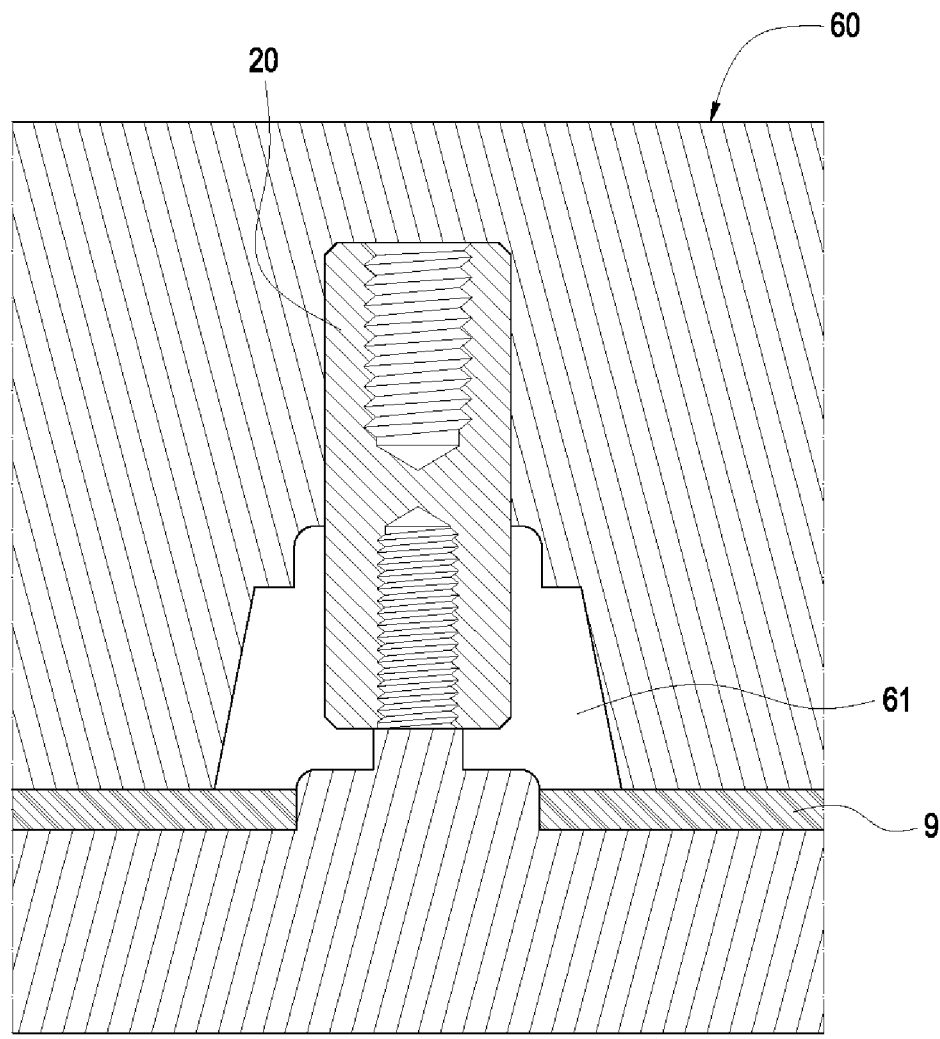
FIG. 11 is the second schematic view of the manufacturing method according to the second embodiment of the present invention.

Referring to FIG. 11, there is shown the second schematic view of the manufacturing method according to the second embodiment of the present invention. As shown in the diagram, the manufacturing method further comprises the step of disposing the fixing post 20 and the casing 9 in a cavity 61 of a mold 60 in a manner to allow the fixing post 20 to correspond in position to the casing 9.

Figure 12:
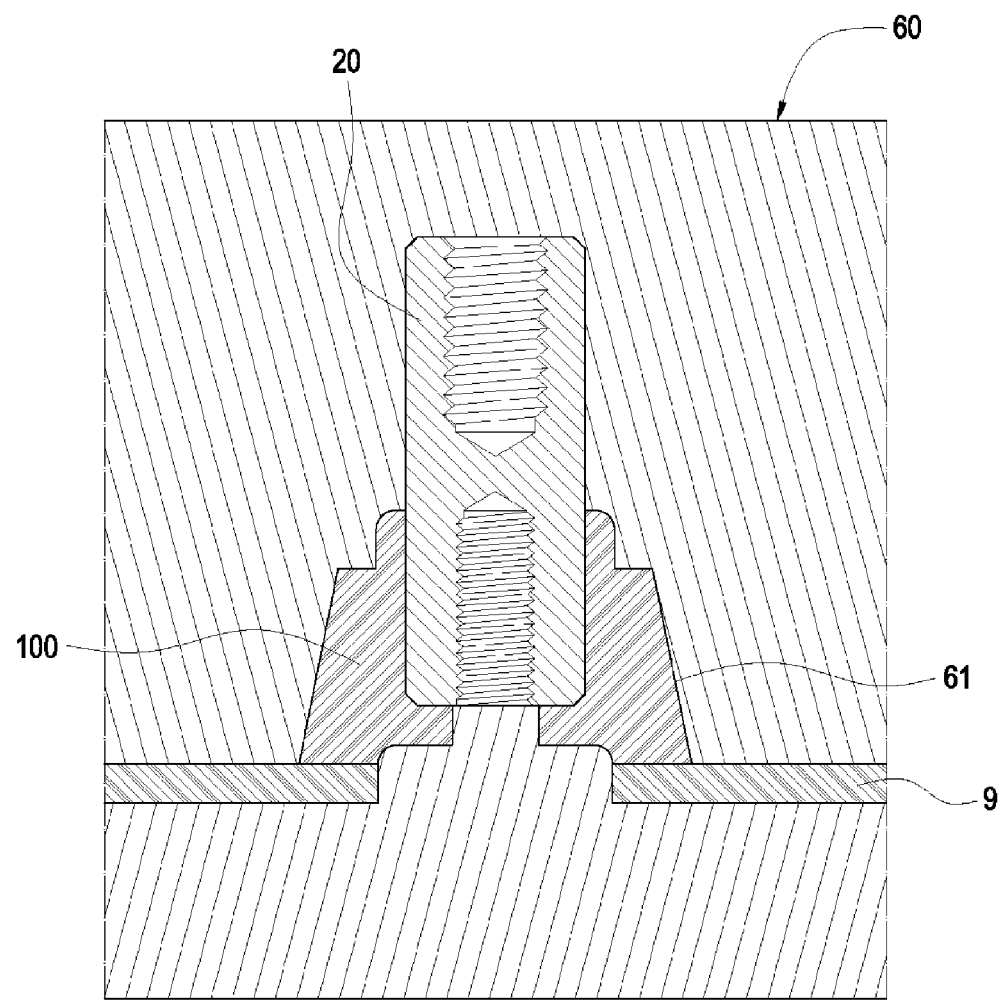
FIG. 12 is the third schematic view of the manufacturing method according to the second embodiment of the present invention.

Referring to FIG. 12, there is shown the third schematic view of the manufacturing method according to the second embodiment of the present invention. As shown in the diagram, the manufacturing method further comprises the step of introducing a liquid high-density glass fiber material 100 into the cavity 61, such that the hollow-core post 10 is formed in the cavity 61 and formed from the high-density glass fiber material 100, wherein the hollow-core post 10 connects with the casing 9 and encloses the fixing segment 21 of the fixing post 20.

Figure 13:
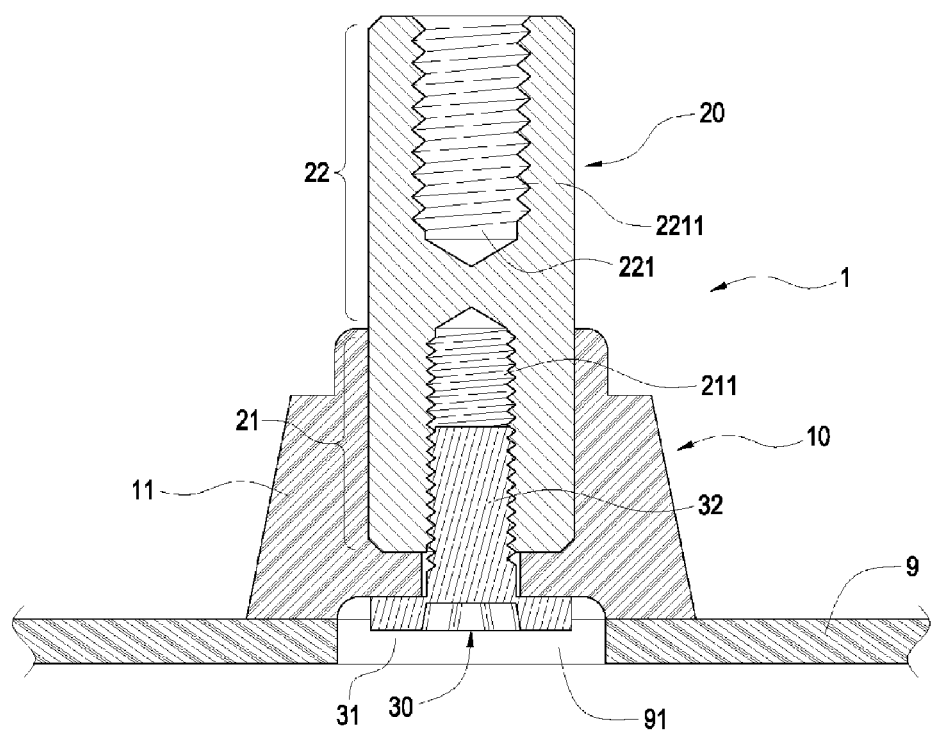
FIG. 13 is the fourth schematic view of the manufacturing method according to the second embodiment of the present invention.

Referring to FIG. 13, there is shown the fourth schematic view of the manufacturing method according to the second embodiment of the present invention. As shown in the diagram, the manufacturing method further comprises the step of forming at the casing 9 the through hole 91 in communication with the inner screw hole 211 of the fixing segment 21, the step of inserting the screwing element 30 into the through hole 91 of the casing 9 so as for the screwing element 30 to be screwed to the inner screw hole 211 of the fixing segment 21 to allow the abutting portion 31 to abut against the casing 9, allow the screwing segment 32 to be inserted into the through hole 91 of the casing 9, and allow the screwing segment 32 to be screwed to the inner screw hole 211 (formed in step 1) of the fixing segment 21.

Finally, the installation component 40 is fastened to the through connection hole 221 of the connecting segment 22 by means of a fastening component 50 and thus screwed to the inner thread 2211, such that the installation component 40 is fixed to the casing 9, as shown in FIG. 4.

Alternatively, the hollow-core post 10 is formed in the cavity 61 and formed from the high-density glass fiber material 100, such that the hollow-core post 10 encloses the fixing segment 21 of the fixing post 20 and connects with the casing 9 to increase the adhesion of the hollow-core post 10 to the fixing segment 21 and thus enhance the strength of engagement therebetween.

In conclusion, a fixing structure for a casing and a method for manufacturing the same according to the present invention have novelty, non-obviousness, and industrial applicability, and the structural features of the present invention have not been manifested by similar products or published before. Therefore, the present invention meets patentability requirements.

What is claimed is:

1. A fixing structure for a casing, comprising:
    a hollow-core post protruding from the casing;
    a fixing post comprising a fixing segment and a connecting segment, the fixing segment being disposed in the hollow-core post and having an inner screw hole, and the connecting segment extending from the fixing segment and having a through connection hole with an inner thread, wherein the hollow-core post is integrally formed with the casing and wrapped around the fixing segment by injection molding such that the hollow-core post is adhered to the fixing segment with the inner screw hole in communication with a through hole in the casing;
    a screwing element inserted into the through hole of the casing and screwed to the inner screw hole; and
    a fastening component screwed to inner thread of the through connection hole.

2. The fixing structure for a casing of claim 1, wherein a plurality of ribs spaced apart from each other protrude from the hollow-core post radially.

3. The fixing structure for a casing of claim 1, wherein the connecting segment is exposed by the hollow-core post.

4. The fixing structure for a casing of claim 1, wherein the screwing element comprises an abutting portion abutting against the casing and a screwing segment extended from the abutting portion, inserted into the casing, and screwed to the inner screw hole.

5. The fixing structure for a casing of claim 1, wherein the through connection hole and the inner screw hole are in communication with each other.

6. The fixing structure for a casing of claim 1, further comprising an installation component fastened to the through connection hole by a fastening component and thus fixed to the casing.

7. The fixing structure for a casing of claim 1, wherein the through connection hole and the inner screw hole are not in communication with each other.

8. The fixing structure for a casing of claim 1, wherein the fixing post does not have an exterior thread.

9. The fixing structure for a casing of claim 1, wherein the through hole in the casing is formed by the injection molding.

10. A method for manufacturing a casing comprising the fixing structure of claim 1, comprising the steps of:
    a) providing the fixing post and forming the inner screw hole in the fixing post;
    b) providing a mold and disposing the fixing post in the mold; and
    c) introducing a liquid high-density glass fiber material into the mold and forming integrally the casing and the hollow-core post in the mold, wherein the hollow-core post encloses the fixing segment of the fixing post, and the through hole is formed in the casing in communication with the inner screw hole.

11. The method for manufacturing the casing of claim 10, further comprising the step of providing the screwing element inserted into the through hole and screwed to the inner screw hole.

12. The method for manufacturing the casing of claim 11, wherein the screwing element comprises an abutting portion abutting against the casing and a screwing segment extended from the abutting portion, inserted into the through hole, and screwed to the inner screw hole.

13. The method for manufacturing the casing of claim 10, wherein a plurality of ribs spaced apart from each other protrude from the hollow-core post radially.

14. The method for manufacturing the casing of claim 10, wherein the inner thread is formed in the through connection hole.

\* \* \* \* \*